Dec. 18, 1956
H. THIENEMANN
2,774,173
TAPERED LEADER FOR FISHING PURPOSES
FROM SYNTHETIC POLYMERS
Filed June 28, 1954
*A THREAD OF SYNTHETIC LINEAR HIGH POLYMERS – 1.8 TO 3.5 METERS LONG LESS THAN 1 MM. IN DIAMETER.*
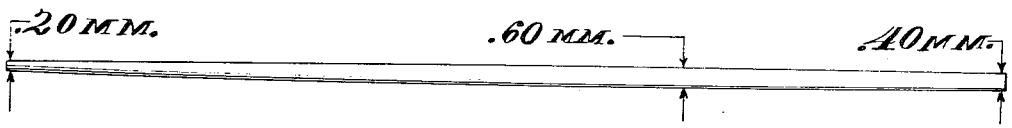
.20 MM.    .60 MM.    .40 MM.
INVENTOR
*HEINZ THIENEMANN*
BY *Henry H. Snelling*
ATTORNEY

United States Patent Office 2,774,173
Patented Dec. 18, 1956

2,774,173

TAPERED LEADER FOR FISHING PURPOSES FROM SYNTHETIC POLYMERS

Heinz Thienemann, Beuel (Rhine), Germany

Application June 28, 1954, Serial No. 461,037

2 Claims. (Cl. 43—44.98)

With sport fishing, especially fishing with artificial flies, these flies have to be attached to a translucent thread which is as fine as possible. This was carried out earlier by tying a silkworm gut in such a way that a thicker gut was started and then finer parts were tied on to it. To the finest part the flies were attached. After introduction of linear polyamide threads in fishing, such leaders were tied from linear polyamides in such a way that several threads of different diameter were tied together while the very thin thread served for the attachment of flies.

Besides this process in which tapered leaders are prepared, it is also known to prepare fishing lines on textile machines by beating silk and rayon yarn, etc. One known form made has been in the form of a double tapered fishing line. This consists of a stem (cord framework) around which a wrapping is placed with a varying diameter. Such lines however are not to be used as leaders for fly fishing but only as throw line to which the leaders are attached.

A leader is placed on the market by the applicant which can be prepared directly from the spinning nozzle in a tapered form, so that the customary knotting of the threads could be omitted. These leaders show, due to the omission of the knots, very good throw characteristics.

It was now found that a leader with surprisingly good throw characteristics could be obtained if the synthetic monofilamentous threads are prepared in such a way that the longitudinal cross-section shows a double conical form, that means that the thread increases first in diameter until 1½ times of the initial diameter and then decreases slowly to a very thin end. The leaders used in fly fishing have mostly a length of 2 to 3 yds.; with a customary leader of 2½ yds. (2.28 m.) the threads are prepared in such a way that after approximately 30 to 80 cm. the size of the diameter is 1½ times as much, and that the end diameter is decreased to at least half of the largest diameter. This is of extraordinary importance with fly fishing because the artificial flies with a weight below 1/10 gram are not readily thrown far enough, if the fishing line to which the leader is tied and also the leader itself, do not have a certain weight. These leaders are thrown with a motion similar to that in snapping a long whip. The leaders which have a double conical form are furthermore characterized by the fact that they consist of a unitary synthetic monofilamentous thread. The procedure is preferably carried out in such a way that the monofilamentous thread is spun immediately from the melt and that by suitable measurements the diameter is varied. These translucent leaders are prepared in lengths of approximately 1.80 to 3.50 meters. Most useful are lengths of 2, 2½ and 3 yds. (1.82 m., 2.28 m. and 2.74 m.). For each length and each strength of the leader the most suitable arrangement of the tapering has to be determined. Generally it is this way: after ⅓ of the length the largest diameter is reached and then the remaining ⅔ of the length is tapered off to the desired fine end. The approximate ratio of length to diameter can be seen from the following typical examples:

1. A 3 yd. leader with the lowest diameter of 0.15 mm. shows the following tapering:

| Beginning | After 0.60 m. | 1.20 m. | 1.80 m. | 2.40 m. | 2.70 m. |
|---|---|---|---|---|---|
| 0.15 mm. | 0.18 mm. | 0.22 mm. | 0.30 mm. | 0.32 mm. | 0.28 mm. |

2. A so-called salmon leader of 3 yds. with the lowest diameter of 0.36 mm. shows the following tapering:

| Beginning | After 0.60 m. | 1.20 m. | 1.80 m. | 2.40 m. | 2.70 m. |
|---|---|---|---|---|---|
| 0.36 mm. | 0.39 mm. | 0.46 mm. | 0.60 mm. | 0.72 mm. | 0.60 mm. |

The typical characteristics of the leader corresponding to the invention consists of the tapering off after the diameter has reached the highest value.

The manufacturing of such leaders is not limited to the examples given above. It is more in the scope of the invention to form all according to the strength to be used, leaders which taper off.

I claim:

1. A tapered leader having excellent throw characteristics comprising a single thread of synthetic linear high polymers of a length between 1.8 and 3.5 meters, in which the diameter of the thread decreases at different rates to the two ends from a maximum diameter located between the ends, said ends being of different diameters, and the distance from the maximum diameter to the finer of the two ends is at least twice as great as the distance from the maximum diameter to the coarser end.

2. The leader of claim 1 in which the smaller end has a diameter roughly half that of the maximum diameter of the leader, and said maximum diameter is less than a millimeter.

References Cited in the file of this patent

UNITED STATES PATENTS

| 2,184,187 | Hildebrandt | Dec. 19, 1939 |
| 2,212,772 | Graves | Aug. 27, 1940 |
| 2,250,832 | Hedge | July 29, 1941 |
| 2,370,112 | Truitt | Feb. 20, 1945 |
| 2,559,080 | MacAllister | July 3, 1950 |